(12) United States Patent
Shinohara

(10) Patent No.: US 6,868,918 B2
(45) Date of Patent: Mar. 22, 2005

(54) POWER TOOL DRIVEN BY LINEAR MOTOR

(75) Inventor: Shigeru Shinohara, Hitachinaka (JP)

(73) Assignee: Hitachi Koki Co., LTD, Tokyo (JP)

( * ) Notice: Subject to any disclaimer, the term of this patent is extended or adjusted under 35 U.S.C. 154(b) by 0 days.

(21) Appl. No.: 10/780,741

(22) Filed: Feb. 19, 2004

(65) Prior Publication Data
US 2004/0163830 A1 Aug. 26, 2004

Related U.S. Application Data

(62) Division of application No. 10/189,447, filed on Jul. 8, 2002, now Pat. No. 6,729,412.

(30) Foreign Application Priority Data

Jul. 6, 2001 (JP) .................................. P2001-205735
Nov. 2, 2001 (JP) .................................. P2001-337773

(51) Int. Cl.[7] .......................... B25D 51/16; B27B 19/04
(52) U.S. Cl. ........................... 173/2; 173/114; 173/117; 30/392
(58) Field of Search ........................... 173/2, 114, 117, 173/217, 176, 183; 30/392, 393; 310/12, 13, 14; 74/49, 110

(56) References Cited

U.S. PATENT DOCUMENTS

| | | | |
|---|---|---|---|
| 3,456,136 A | 7/1969 | Pierro | |
| 3,581,830 A | 6/1971 | Stoner | |
| 4,583,027 A | 4/1986 | Parker et al. | |
| 4,847,513 A | 7/1989 | Katz et al. | |
| 4,862,592 A | 9/1989 | Richard et al. | |
| 5,042,592 A | 8/1991 | Fisher | |
| 5,513,709 A | 5/1996 | Fisher | |
| 5,661,350 A | 8/1997 | Lucidarme et al. | |
| 5,736,797 A | 4/1998 | Motohashi et al. | |
| 5,921,134 A | 7/1999 | Shiba et al. | |
| 6,216,798 B1 | 4/2001 | Riello et al. | |
| 6,370,781 B1 | 4/2002 | Sasaki | |
| 6,508,314 B2 * | 1/2003 | Akamatsu et al. | 173/2 |
| 6,520,266 B2 * | 2/2003 | Bongers-Ambrosius et al. | 173/2 |
| 6,520,269 B2 * | 2/2003 | Geiger et al. | 173/117 |
| 6,681,869 B2 * | 1/2004 | Wursch et al. | 173/2 |
| 6,761,229 B2 * | 7/2004 | Cripe et al. | 173/176 |

FOREIGN PATENT DOCUMENTS

| | | |
|---|---|---|
| JP | 58-45880 | 3/1983 |
| JP | 59-176001 | 10/1984 |
| JP | 63-95849 | 4/1988 |
| JP | 63-107452 | 5/1988 |
| JP | 4-23272 | 1/1992 |
| JP | 8-502880 | 3/1996 |
| JP | 3-021500 | 1/2000 |
| JP | 2000-79460 | 3/2000 |
| JP | 2000-225517 | 8/2000 |
| WO | WO 89-08345 | 9/1989 |

* cited by examiner

Primary Examiner—Scott A. Smith
(74) Attorney, Agent, or Firm—Sughrue Mion, PLLC

(57) ABSTRACT

A power tool includes a linear motor and a maximum reciprocal movement amount setting unit. The linear motor has a movable member driven to move reciprocally and a tool connector for connecting work bits to the movable member. The maximum reciprocal movement amount setting unit is for setting maximum reciprocal movement amount at which the linear motor drives movement of the movable member to a selected one of a plurality of maximum reciprocal movement amounts. Also, a position information region is provided on the movable member. A movable member region detector detects the movable member position information region of the movable member and a control unit sets, as the initial position of the movable member, position of the movable member at the time the movable member region detector detects the movable member position information region.

6 Claims, 13 Drawing Sheets

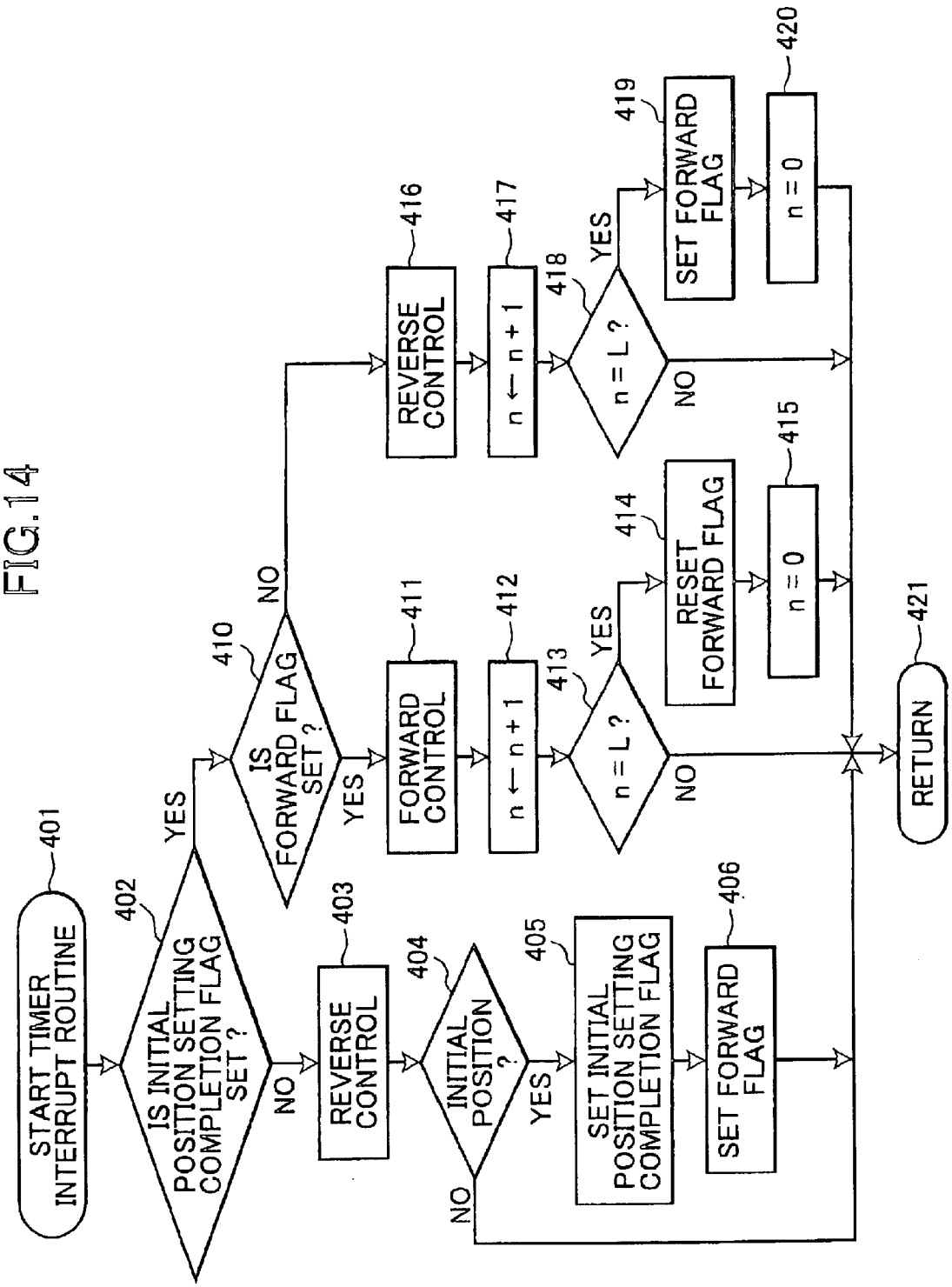

POWER TOOL DRIVEN BY LINEAR MOTOR

This is a divisional of application Ser. No. 10/189,447 filed Jul. 8, 2002 now U.S Pat. No. 6,729,412; the disclosure of which is incorporated herein by reference.

BACKGROUND OF THE INVENTION

1. Field of the Invention

The present invention relates to a power tool, such as a jigsaw or saber saw, for reciprocally driving a blade.

2. Description of the Related Art

Reciprocal-movement power tools, such as jigsaws and saber saws, cut work pieces by reciprocating a blade. When the work piece is thick, the blade needs to be reciprocated by a large movement amount to produce a large cutting force. On the other hand, when the work piece is thin, it is better to reciprocate the blade by a small movement amount. Problems arise when a power tool with a large reciprocating amount is used to cut a thin work piece. For example, the work piece can be shaken by movement the blade, the cut surfaces can be roughly cut, the work piece can bend, and the blade can break. On the other hand, problems can also arise when a reciprocal-movement power tool with a small movement amount is used to cut a thick work piece. For example, saw dust is not properly removed, clogs can occur because dust is not properly removed, the cut surfaces can be roughly cut, and the life of the blade can be shortened because the same part of the blade is always used.

Japanese Patent-Application Publication Nos. 59-176001 and 2000-225517 disclose reciprocal-movement power tools capable of mechanically changing reciprocal movement amount. However, the power tools disclosed in these publications change the reciprocal movement amount using a complicated mechanism for converting rotational movement of a motor into reciprocal movement for cutting and machining. In addition, these conversion mechanism generate a great deal of vibration and noise.

SUMMARY OF THE INVENTION

To solve these problems, it is conceivable to provide a reciprocal-movement power tool with a linear motor and attach the blade to the tip of the drive shaft of the linear motor. However, if a linear motor was used as the drive source for a reciprocating tool, there would be a need to fix the start position of the drive shaft. If the start position is not fixed, then the start position of the drive shaft, that is, the position of the drive shaft before power of the power tool is turned ON, would be determined by where the drive shaft was positioned when power of the power tool was last turned OFF. In this case, when the power is turned ON to start reciprocal movement of the drive shaft, the drive shaft will hit against the housing of the power tool either when the drive shaft moves forward or in reverse. Such a problem is not present in conventional reciprocal-movement power tools, because the range of the reciprocal movement is fixed mechanically by the mechanism that converts rotary movement of a rotary motor into linear movement of the blade.

It is an objective of the present invention to overcome the above-described problems and provide a reciprocal-movement power tool driven by a linear motor, and with no complicated mechanisms for changing reciprocal movement amount.

In order to achieve the above-described objective, a power tool according to one aspect to the present invention includes a linear motor and a maximum reciprocal movement amount setting unit. The linear motor has a movable member driven to move reciprocally. The movable member has a tool connector for connecting work bits to the movable member. The maximum reciprocal movement amount setting unit is for setting maximum reciprocal movement amount at which the linear motor drives movement of the movable member to a selected one of a plurality of maximum reciprocal movement amounts.

A power tool according to another aspect of the present invention includes a linear motor and a movable member region detector. The linear motor has a movable member driven to move reciprocally. The movable member has a tool connector and a position information region. The tool connector is for connecting work bits to the movable member. The movable member region detector detects the movable member position information region of the movable member.

BRIEF DESCRIPTION OF THE DRAWINGS

The above and other objects, features and advantages of the invention will become more apparent from reading the following description of the embodiment taken in connection with the accompanying drawings in which:

FIG. 14 is a flowchart representing timer interrupt operations performed by the circuitry shown in FIG. 12.

DETAILED DESCRIPTION OF THE EMBODIMENTS

Next, power tools according to embodiments of the present invention will be described while referring to the attached drawings.

Figure 1:
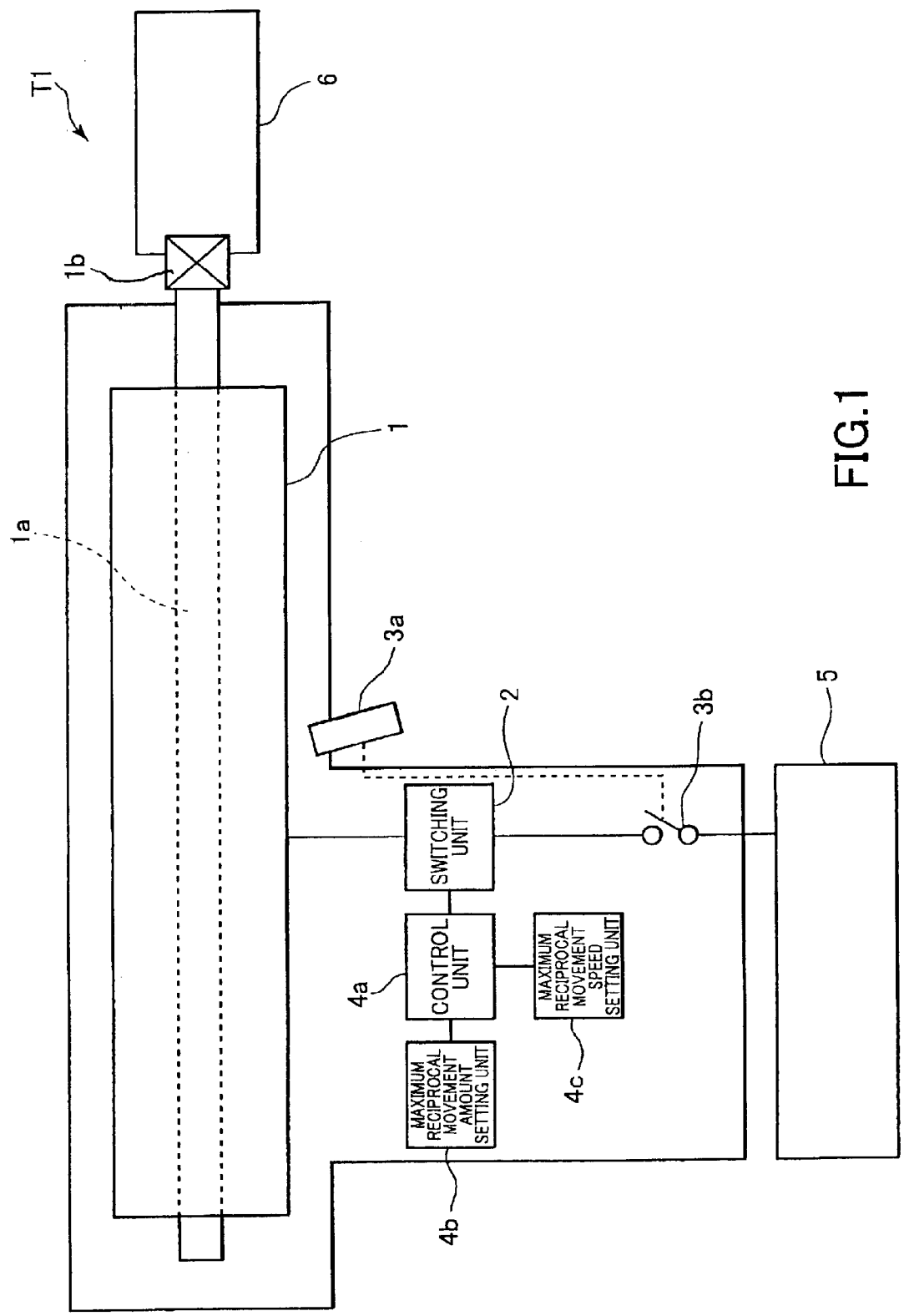
FIG. 1 is a schematic view showing basic configuration of a power tool, including a linear motor, according to a first embodiment of the present invention.

FIG. 1 shows basic configuration of a power tool T1 according to a first embodiment of the present invention. The power tool T1 includes a linear motor 1, a switching unit 2, a trigger lever 3a, a power switch 3b, a control unit 4a, a maximum reciprocal movement amount setting unit 4b, a maximum reciprocal movement speed setting unit 4c, and a direct current power-source 5.

The linear motor 1 drives a movable member 1a to move reciprocally. The movable member 1a includes a bit connector 1b. The bit connector 1b is for attaching a bit 6 to the movable member 1a. The bit 6 is a blade, for example.

The switching unit 2 switches polarity of voltage applied to the linear motor 1 to switch the movable member 1a reciprocally between forward and reverse directions. The switching unit 2 further switches how often, that is, the frequency, that voltage is applied to the linear motor 1 to control the speed at which the movable member 1a moves in the forward or reverse direction. The trigger lever 3a is disposed where the power tool's handle is attached to the main body of the power tool. The power switch 3b is operated in linked association with the trigger lever 3a. That is, contact points of the power switch 3b close when the trigger lever 3a is pulled and open with the trigger lever 3a is released. The control unit 4a controls switching operations of the switching unit 2. The maximum reciprocal movement amount setting unit 4b is for setting the maximum reciprocal movement amount, that is, the distance range of reciprocal movement that the linear motor 1 moves the movable member 1a. The maximum reciprocal movement speed setting unit 4c is for setting the maximum reciprocal movement speed of the linear motor 1. The maximum reciprocal movement amount setting unit 4b and the maximum reciprocal movement speed setting unit 4c each include a dial and a variable resistor. The dials are provided on the outer surface of the power tool casing at positions easily accessible to the user. The dial of the maximum reciprocal movement amount setting unit 4b indicates several levels of maximum reciprocal movement amount, and the dial of the maximum reciprocal movement speed setting unit 4c indicates several levels of maximum reciprocal movement speed, that can be set by the user rotating the dial. The variable resistors change resistance value in association with rotation of the corresponding dial and the control unit 4a detects the resulting resistance values to determine the maximum values set by the user. It should be noted that the dials can be replaced with any other value setting unit, such as a slider for producing linear movement. Further, the variable resistors can be replaced by digital switches that change digital output value based on amount of rotational, linear, or other movement of a value setting unit, such a dial or slider.

When the trigger lever 3a is pulled, the contact points of the power switch 3b close and voltage is supplied from the direct current power source 5 to the linear motor 1 through the switching unit 2. The control unit 4a controls the switching unit 2 based on settings at the maximum reciprocal movement amount setting unit 4b and the maximum reciprocal movement speed setting unit 4c to control how frequently and at what polarity voltage is applied to the linear motor 1, in order to control the maximum reciprocal movement amount and the maximum reciprocal movement speed of the linear motor 1. That is, the maximum reciprocal movement amount and the maximum reciprocal movement speed are increased when the work piece is thick and decreased when the work piece is thin.

Figure 2:
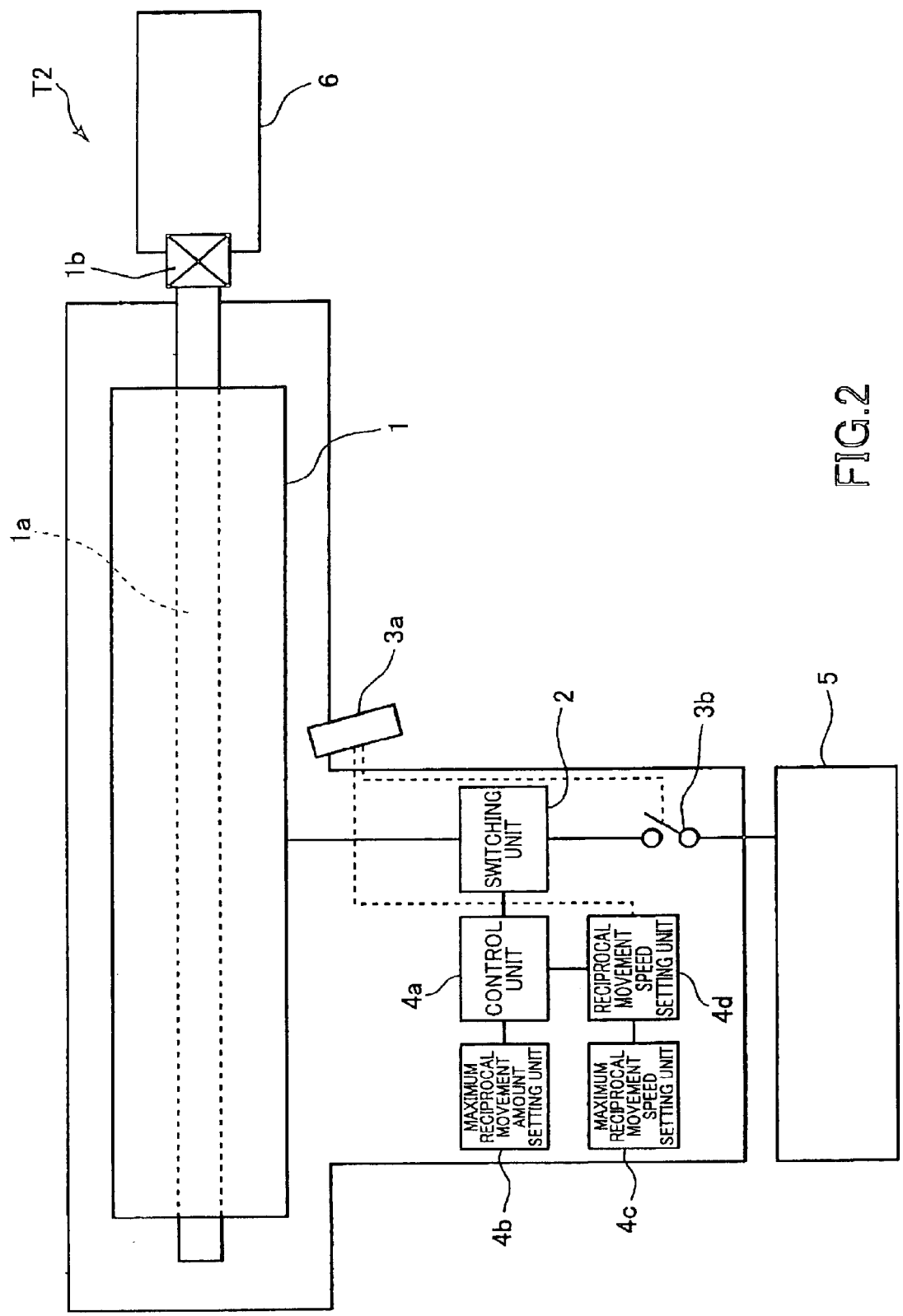
FIG. 2 is a schematic view showing basic configuration of a power tool, including a linear motor, according to a second embodiment of the present invention.

FIG. 2 is a schematic view showing basic configuration of a power tool T2 according to a second embodiment of the present invention. The power tool T2 of FIG. 2 differs from the power tool T1 of FIG. 1 in that a reciprocal movement speed setting unit 4d is interposed between the control unit 4a and the maximum reciprocal movement speed setting unit 4c. The reciprocal movement speed setting unit 4d is connected to the trigger lever 3a and sets the reciprocal movement speed of the movable member 1a in linked association with movement of the trigger lever 3a. As a result, when the trigger lever 3a is pulled, in addition to the power switch 3b being turned ON, the reciprocal movement speed setting unit 4d changes the reciprocal movement speed in association with the amount that the trigger lever 3a is pulled. That is, when the trigger lever 3a is only pulled a slight bit, then the power switch 3b turns ON and also the linear motor 1 starts up at a relatively slow reciprocal movement speed. If the trigger lever 3a is pulled a great deal, then the reciprocal movement speed of the linear motor 1 increases in association with the pulled amount of the trigger lever 3a.

Figure 3:
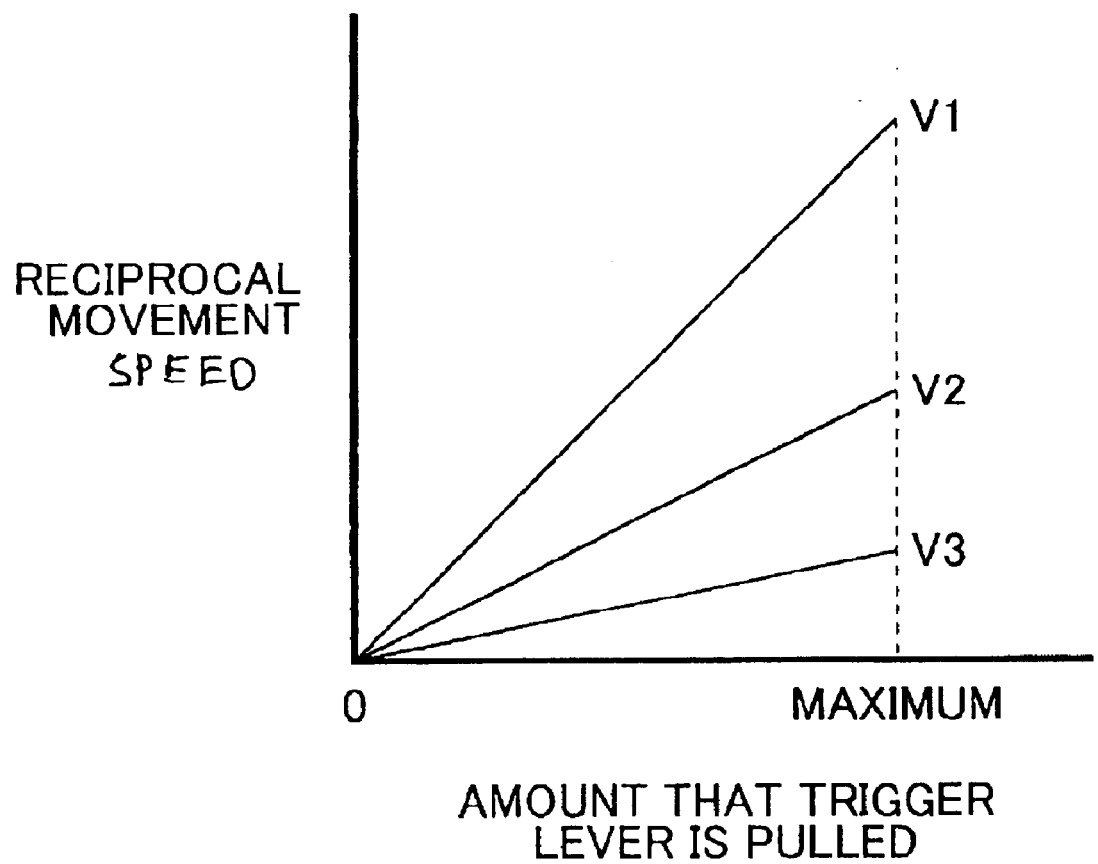
FIG. 3 is a graph representing the speed control characteristic of the power tool shown in FIG. 2.

According to the second embodiment, the speed at which the linear motor 1 moves the movable member 1a is changed in accordance with the values set in both the maximum reciprocal movement speed setting unit 4c and the reciprocal movement speed setting unit 4d. This will be explained with reference to the example in FIG. 3. In the example of FIG. 3, the maximum reciprocal movement speed setting unit 4c sets one of three maximum reciprocal movement speeds V1, V2, V3 based on setting of a dial, slider, or other different mechanism than the trigger lever 3a. The reciprocal movement speed setting unit 4d sets the reciprocal movement speed of the linear motor 1 within the presently set maximum reciprocal movement speed V1, V2, or V3 in accordance with amount that the trigger lever 3a is pulled.

Figure 4:
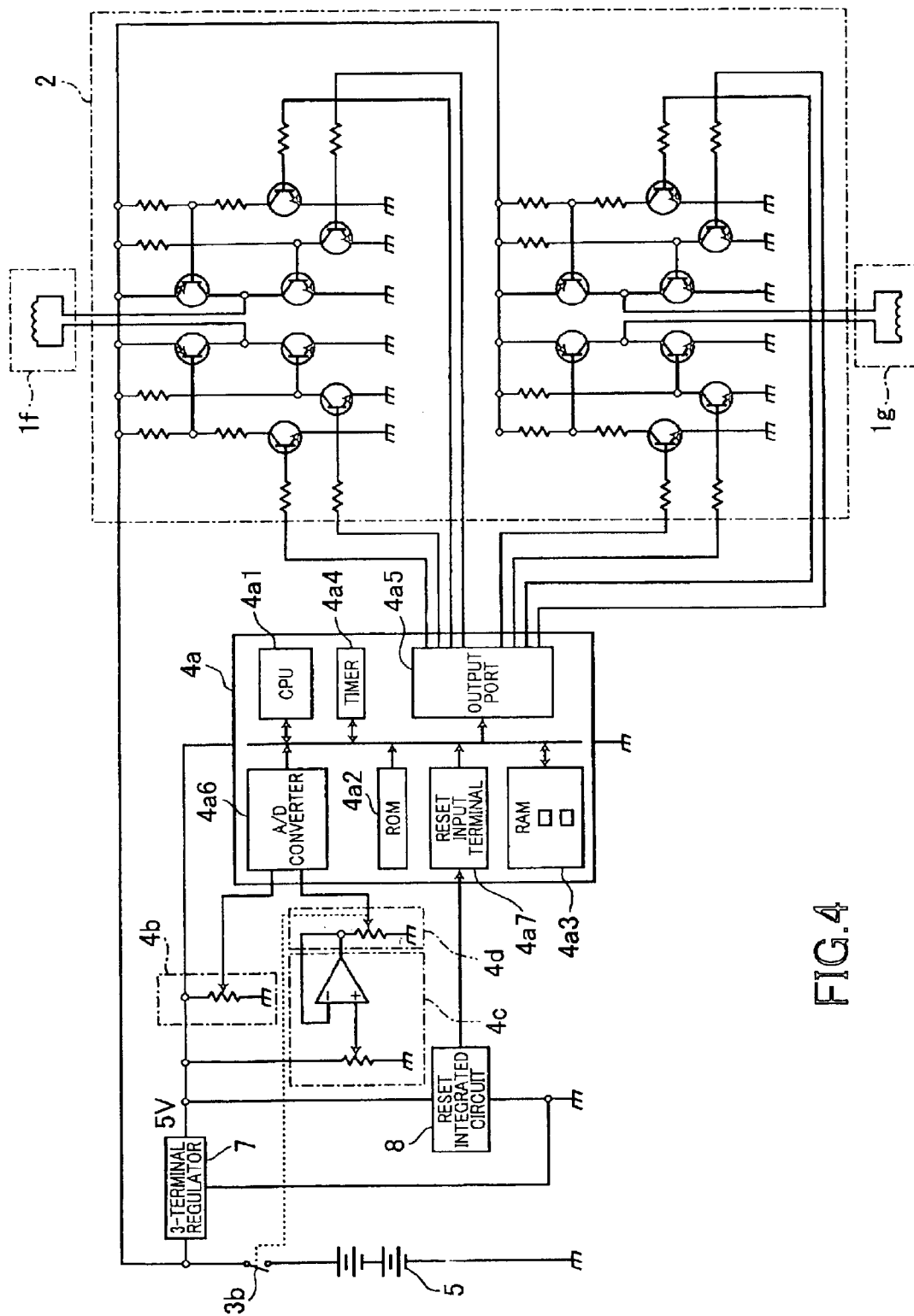
FIG. 4 is a circuit diagram showing a concrete example of circuit configuration of the power tool shown in FIG. 2.

FIG. 4 is a circuit diagram showing a concrete example of circuit configuration of the power tool T2 shown in FIG. 2. In the concrete example of FIG. 4, the linear motor 1 is a two-phase stepping motor that includes a first-phase motor coil 1f and a second-phase motor coil 1g. The switching unit 2 is configured from a bridge circuit by resistors and transistors. The control unit 4a is configured from a single chip microcomputer including a CPU 4a1, a ROM 4a2, a RAM 4a3, a timer 4a4, an output port 4a5, an A/D converter 4a6, and a reset input terminal 4a7. The maximum reciprocal movement amount setting unit 4b includes a variable resistor. The maximum reciprocal movement speed setting unit 4c includes a variable resistor and a voltage follower operation amplifier. The reciprocal movement speed setting unit 4d includes a variable resistor connected to the operation amplifier of the maximum reciprocal movement speed setting unit 4c. The direct current power source 5 is a battery. Further, a three terminal regulator 7 and a reset integrated circuit 8 are provided. The three terminal regulator 7 serves as the power source for the control unit 4a and the reset integrated circuit 8 generates a reset signal and supplies it to the control unit 4a. Although the example shown in FIG. 4 shows the reciprocal movement speed setting unit 4d as being configured from a variable resistor, the reciprocal movement speed setting unit 4d could be configured from a digital switch that changes digital output value in accordance with rotational, linear, or other movement of the trigger lever 3a being pulled.

Figure 5:
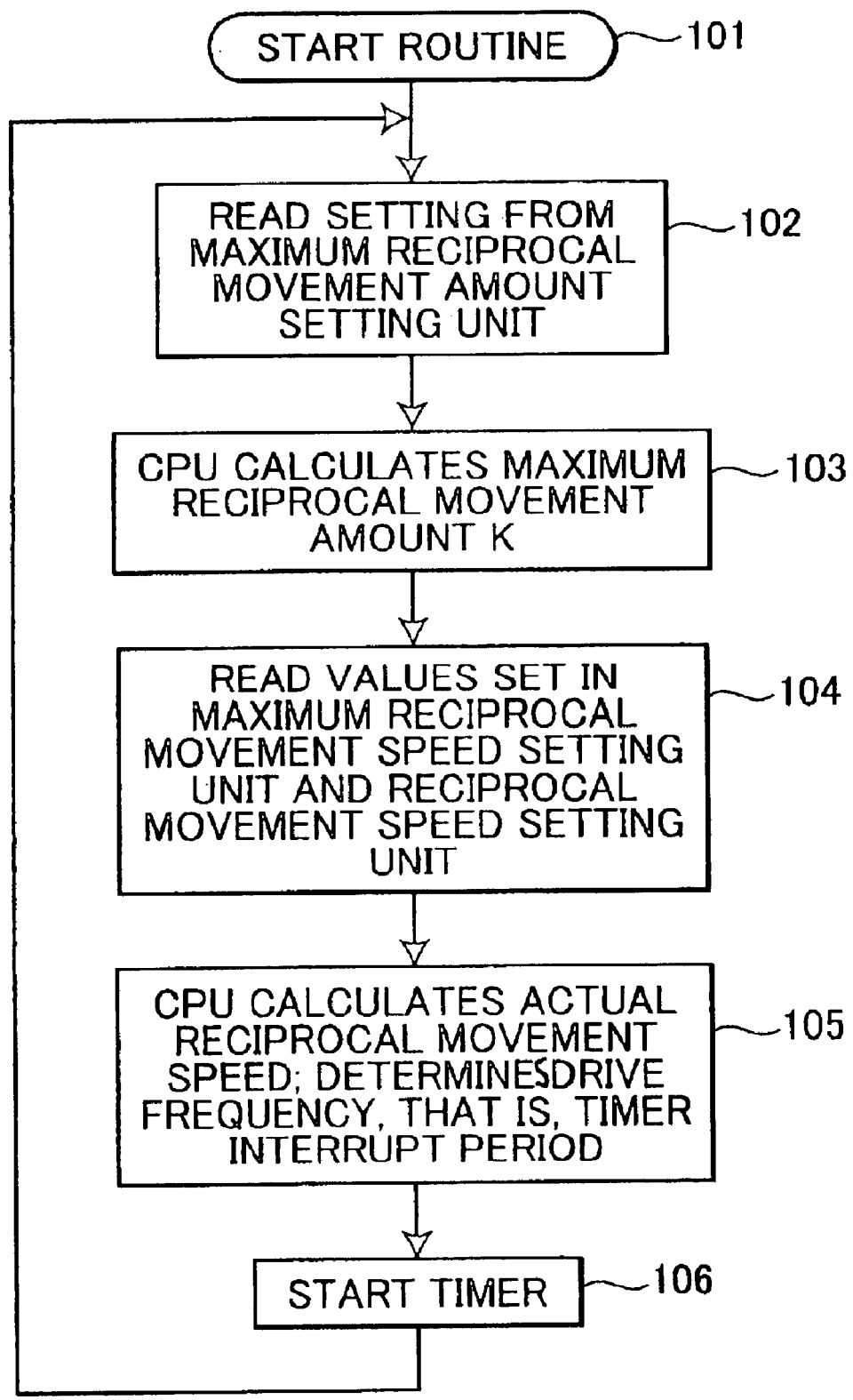
FIG. 5 is a flowchart representing main operations performed by the circuitry shown in FIG. 4.
Figure 6:
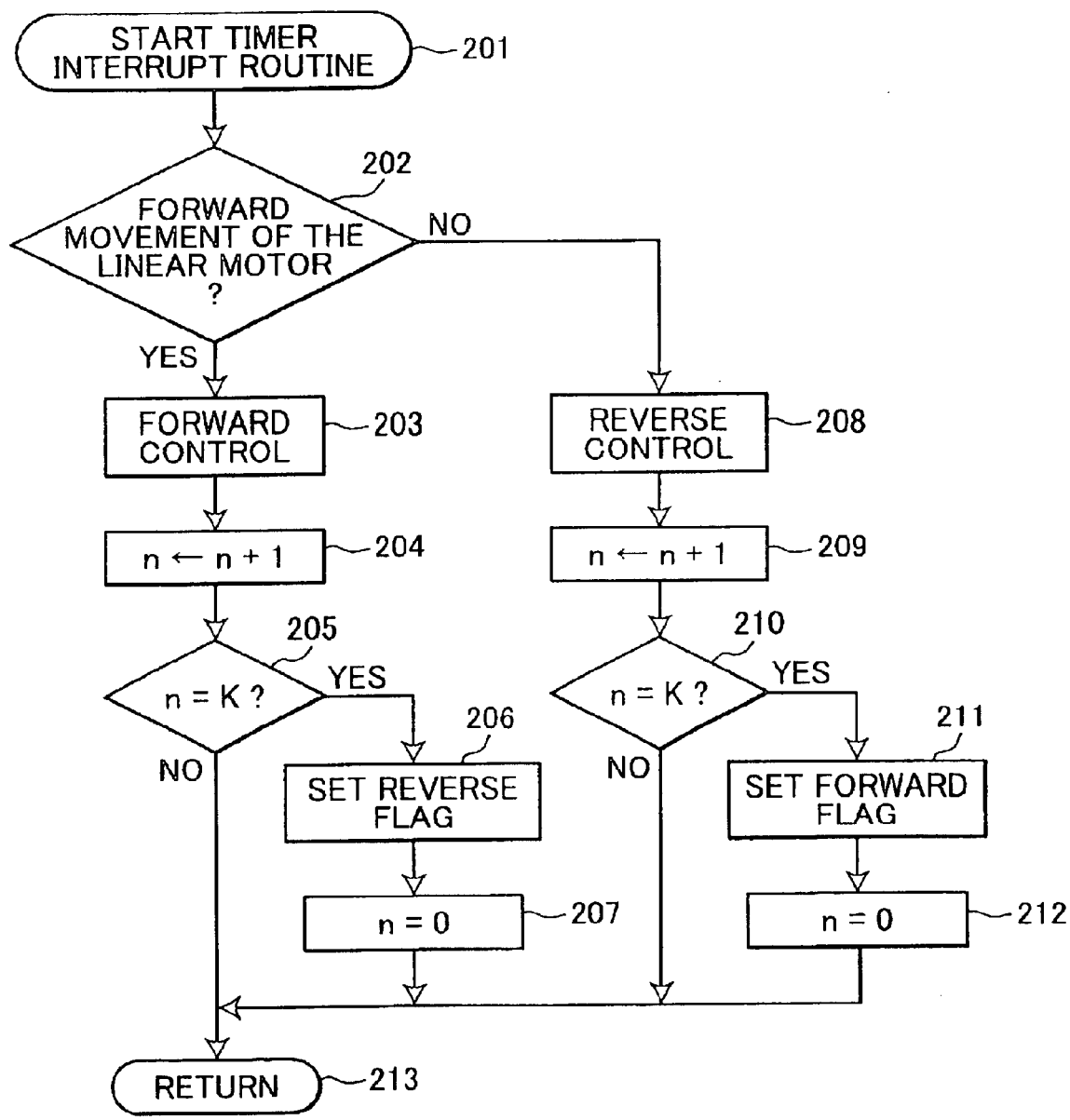
FIG. 6 is a flowchart representing timer interrupt operations performed by the circuitry shown in FIG. 4.

Operations performed by the configuration of FIG. 4 will be described with reference to the flowchart in FIG. 5. When the contact points of the power switch 3b are closed by operation of the trigger lever 3a, then the control unit 4a starts operating in S101. First, the value set in the maximum reciprocal movement amount setting unit 4b are retrieved in S102 and, based on the retrieved value, the CPU 4a1 calculates a maximum reciprocal movement amount K in S103. Next, the values set in the maximum reciprocal movement speed setting unit 4c and the reciprocal movement speed setting unit 4d are read in S104 and, based on both these values, the CPU 4a1 calculates in S105 the actual reciprocal movement speed desired for the linear motor 1. The CPU 4a1 determines the drive frequency required to achieve this actual reciprocal movement speed. The CPU 4a1 changes the drive frequency by changing a timer interrupt period measured by a timer started in S106. The timer interrupt period determines how often a timer interrupt routine represented in FIG. 6 is performed. The timer interrupt routine controls the linear motor 1 to move the movable member 1a by a certain amount forward or in reverse. Therefore, the control unit 4a reduces the timer interrupt period, so that the timer interrupt routine is performed more frequently, when the maximum reciprocal movement speed setting unit 4c or the reciprocal movement speed setting unit 4d is set with a value to increase the reciprocal movement speed and increases the timer interrupt period, so that the timer interrupt routine is performed less frequently, when the maximum reciprocal movement speed setting unit 4c or the reciprocal movement speed setting unit 4d is set with a value to decrease the reciprocal movement speed.

When the timer interrupt period elapses as measured by the timer started in S106, the timer interrupt routine is started in S201 of the flowchart of FIG. 6. In S202 a forward flag and reverse flag that indicate whether the linear motor 1 is moving forward or in reverse are checked. When it is judged that the linear motor 1 is moving forward (S202;YES), then a forward control is performed in S203. In the forward control, the control unit 4a controls the switching unit 2 from the output port 4a5 to drive the linear motor 1 to move forward by a certain distance. After the forward control is completed, in S204 the actual movement step number n is incremented by one, and in S205 it is judged whether the maximum reciprocal movement amount K calculated in S103 has been reached. When the maximum reciprocal movement amount K has not be reached (S204:NO), then the routine returns in S213. When the maximum reciprocal movement amount K has been reached (S205:YES), then the reverse flag is set and the forward flag is reset in S206, a counter that measures the actual movement step number is reset to 0 in S207, and the routine returns in S213. During a reverse movement of the linear motor 1 (S202:NO), the reverse control is performed in S208 to move the movable member 1a in the reverse direction by a certain distance. After the reverse control is completed, the actual movement step number n is incremented by one in S209 and it is judged whether the maximum reciprocal movement amount K has been reached in S210. When the maximum reciprocal movement amount K has not be reached (S210:NO), then the routine returns in S213. When the maximum reciprocal movement amount K has been reached (5210:YES), then the forward flag is set and the reverse flag is reset in S211, the counter that measures the actual movement step number is reset to 0 in S212, and the routine returns in S213.

Figure 7:
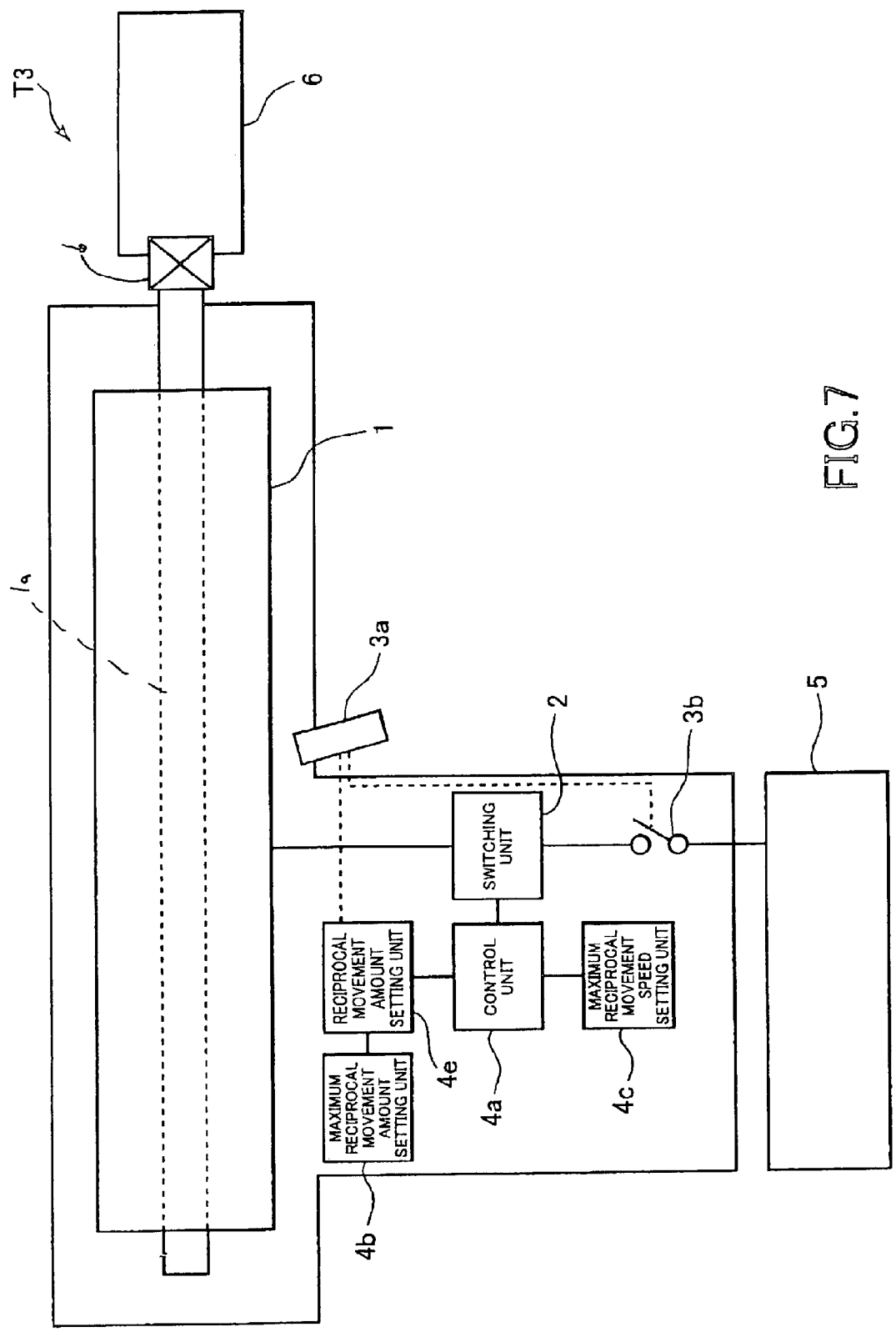
FIG. 7 is a schematic view showing basic configuration of a power tool, including a linear motor, according to a third embodiment of the present invention.

FIG. 7 shows a power tool T3 according to a third embodiment of the present invention. The power tool T3 differs from the power tool T1 of the first embodiment in that a reciprocal movement amount setting unit 4e is interposed between the control unit 4a and the maximum reciprocal movement amount setting unit 4b. The reciprocal movement amount setting unit 4e is connected to the trigger lever 3a and includes a variable resistor that changes resistance value, or a digital switch that changes digital output value, in association with pivoting or linear movement of the trigger lever 3a to set the reciprocal movement amount in linking association with movement of the trigger lever 3a. With this configuration, when the trigger lever 3a is pulled, the power switch 3b is turned ON and the reciprocal movement amount of the linear motor 1 changes in association with amount that the trigger lever 3a is pulled. That is, when the trigger lever 3a is only pulled a slight bit, then the power switch 3b turns ON and the linear motor 1 starts up with a relatively small reciprocal movement amount. If the trigger lever 3a is pulled a great deal, then the reciprocal movement amount of the linear motor 1 increases in association with the pulled amount of the trigger lever 3a.

Figure 8:
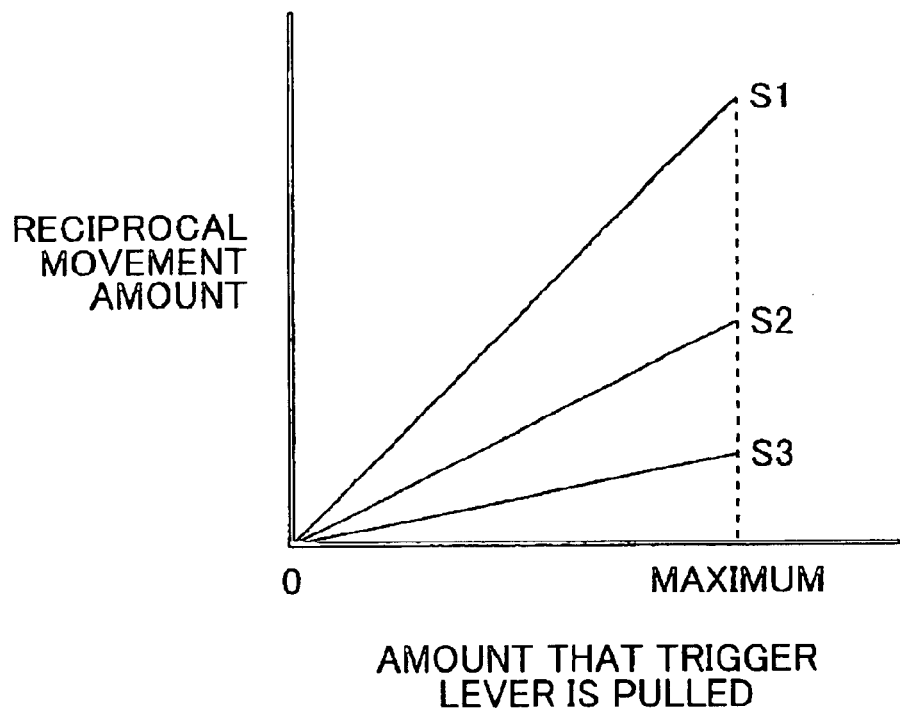
FIG. 8 is a graph representing reciprocal movement amount characteristic of the power tool shown in FIG. 7.

According to the third embodiment shown in FIG. 7, the distance that the linear motor 1 reciprocally moves the movable member 1a is changed in accordance with the values set in both the maximum reciprocal movement amount setting unit 4b and the reciprocal movement amount setting unit 4e. This will be explained with reference to the example shown in FIG. 8. In the example of FIG. 8, the maximum reciprocal movement amount setting unit 4b sets one of three maximum reciprocal movement amounts S1, S2, and S3 based on setting of a dial, slider, or other different mechanism than the trigger lever 3a. The reciprocal movement amount setting unit 4e then sets the reciprocal movement amount value within the presently set maximum reciprocal movement amount S1, S2, or S3 in accordance with amount that the trigger lever 3a is pulled.

Figure 9:
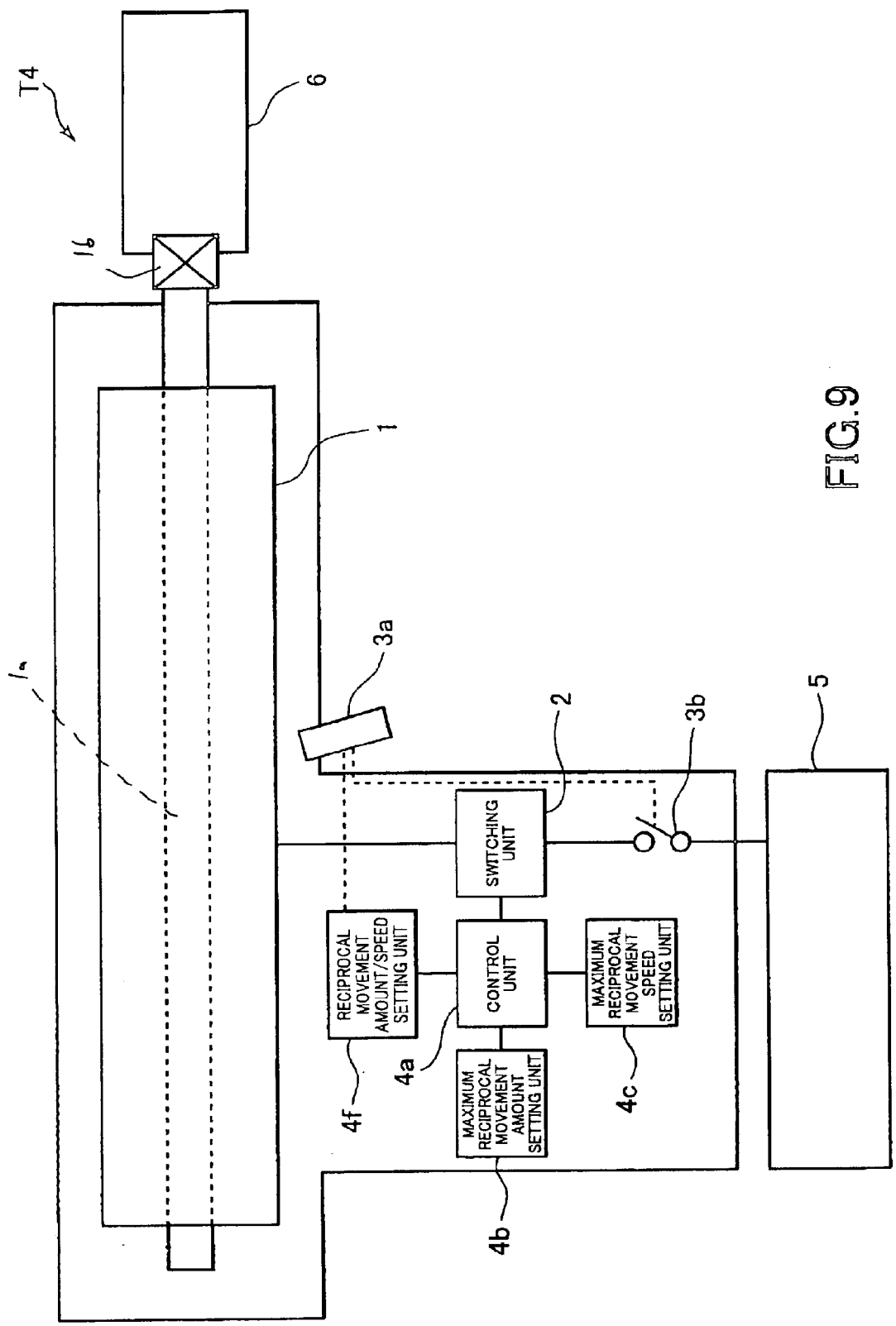
FIG. 9 is a schematic view showing basic configuration of a power tool, including a linear motor, according to a fourth embodiment of the present invention.

FIG. 9 shows a power tool T4 according to a fourth embodiment of the present invention. The power tool T4 differs from the power tool T1 of the first embodiment in that a reciprocal movement amount/speed setting unit 4f is further connected to the control unit 4a. The reciprocal movement amount/speed setting unit 4f is connected to the trigger lever 3a. With this configuration, when the trigger lever 3a is pulled, the power switch 3b turned ON and the reciprocal movement amount and speed of the linear motor 1 changes in association with amount that the trigger lever 3a is pulled. For example, when the trigger lever 3a is only pulled a slight bit, then the power switch 3b turns ON and also the linear motor 1 starts up at a relatively small reciprocal movement amount and a slow reciprocal movement speed. If the trigger lever 3a is pulled a great deal, then the reciprocal movement amount and the reciprocal movement speed of the linear motor 1 increases in association with the pulled amount of the trigger lever 3a.

According to the fourth embodiment, the speed and amount that the linear motor 1 moves the movable member 1a is changed in accordance with the values set in the maximum reciprocal movement amount setting unit 4b, the maximum reciprocal movement speed setting unit 4c, and the reciprocal movement amount/speed setting unit 4f. That is, the maximum reciprocal movement amount setting unit 4b sets one of a plurality of maximum reciprocal movement amounts, and the maximum reciprocal movement speed setting unit 4c sets one of a plurality of maximum reciprocal movement speeds based on setting of a dial, slider, or other different mechanism than the trigger lever 3a. The reciprocal movement amount/speed setting unit 4f sets the reciprocal movement amount and the reciprocal movement speed of the linear motor 1 within the presently set maximum reciprocal movement speed and amount in accordance with the amount that the trigger lever 3a is pulled.

Figure 11:
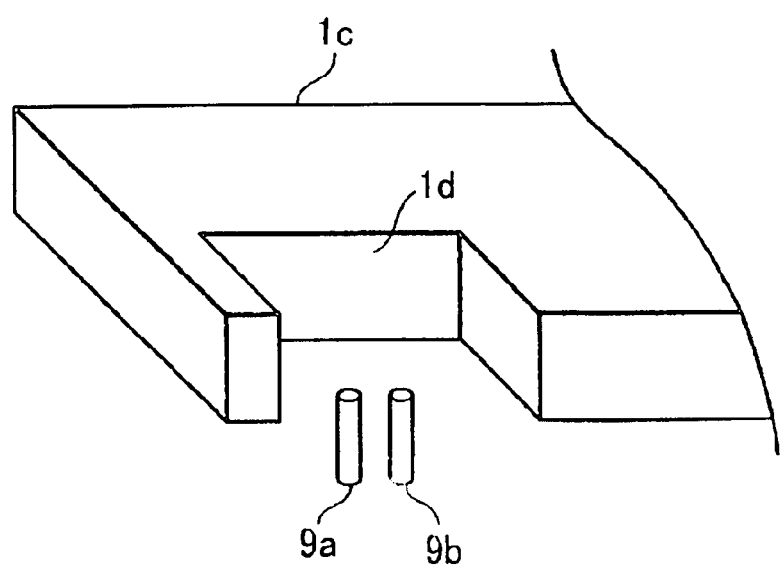
FIG. 11 is a partial perspective view showing configuration of the power tool in FIG. 10 for limiting range of reciprocal movement of a drive shaft of the linear motor within a predetermined range.
Figure 10:
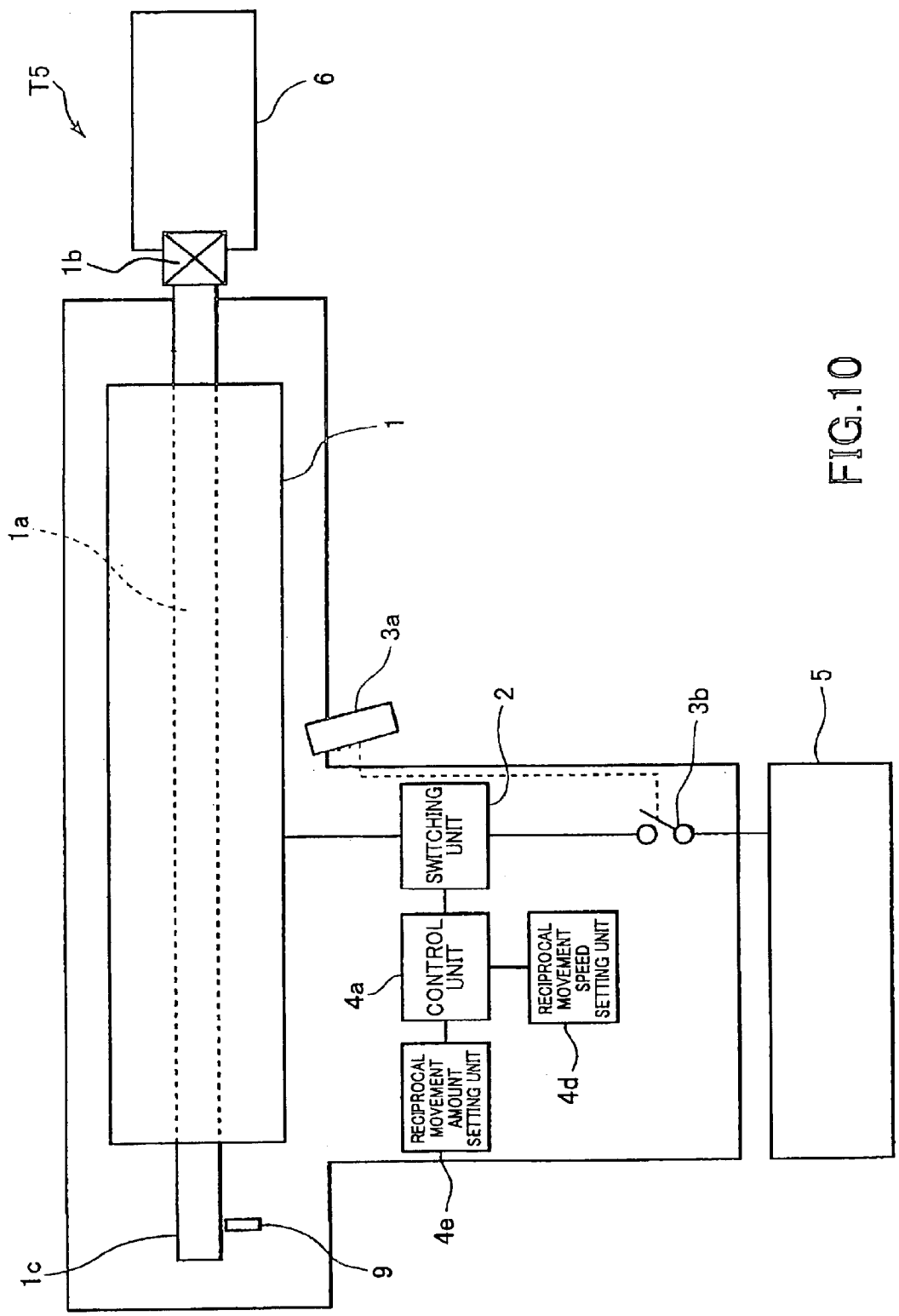
FIG. 10 is a schematic view showing basic configuration of a power tool, including a linear motor, according to a fifth embodiment of the present invention.

FIG. 10 shows a power tool according to a fifth embodiment of the present invention. According to the fifth embodiment, both the reciprocal movement speed setting unit 4d and the reciprocal movement amount setting unit 4e are connected directly to the control unit 4a. Further, a movable element movement region detector 9 is disposed adjacent to a detected end 1c of the movable member 1a. As shown in FIG. 11, the detected end 1c of the movable member 1a is formed with a notch 1d, which serves as a movable position information region.

Figure 12:
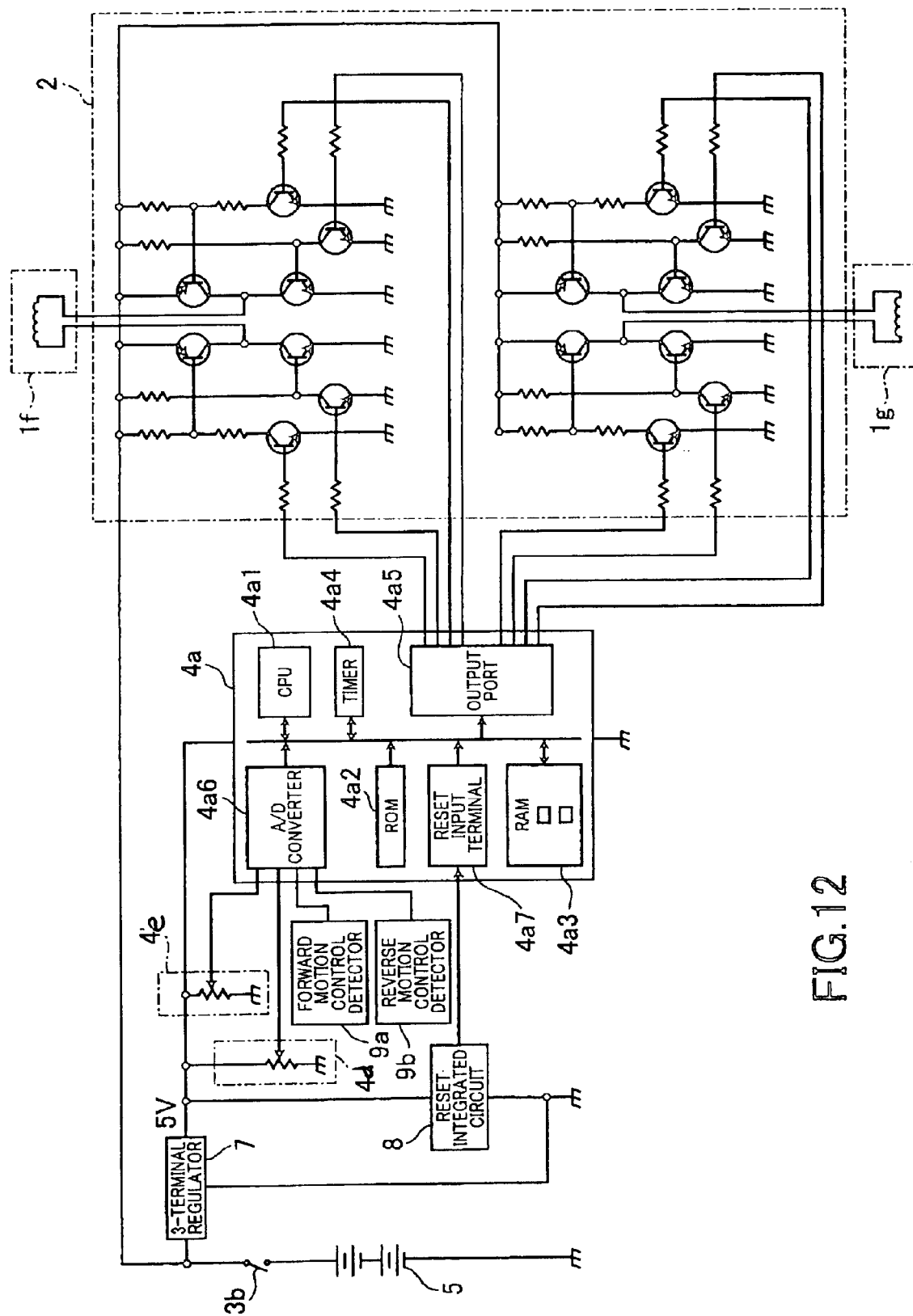
FIG. 12 is a circuit diagram showing a concrete example of electrical components of the power tool shown in FIG. 10.

The movable element movement region detector 9 is provided for detecting the notch 1d. The movable element movement region detector 9 includes a forward motion control detector 9a and a reverse motion control detector 9b. The forward motion control detector 9a and the reverse motion control detector 9b can be configured from a reflection type photo sensor or an inductance sensor. As shown in FIG. 12, the two detectors 9a and 9b are connected to the A/D converter 4a6 of the control unit 4a. It should be noted that although two detectors 9a and 9b are provided in the embodiment, only one detector needs to be provided to achieve the same effects. Also, although the embodiment of FIG. 12 shows the setting units 4d and 4e as being configured from variable resistors that change resistance value in association with pivoting or linear movement of the trigger lever 3a, the setting units 4d and 4e could be digital switches that change digital output value in association with pivoting or linear movement of the trigger lever 3a.

When the trigger lever 3a is pulled, the power switch 3b closes and voltage is supplied from the direct current power source 5 to the linear motor 1 through the switching unit 2. In order to control the reciprocal movement amount and the reciprocal movement speed of the linear motor 1, the control unit 4a controls how often, that is, the frequency, that voltage is applied to the linear motor 1 and the polarity of the voltage that is applied to the linear motor 1 based on settings in the reciprocal movement speed setting unit 4d and the reciprocal movement amount setting unit 4e. The amount, that is, movement range, that the linear motor 1 moves the movable member 1a is restricted to the reciprocal movement region determined by the movable element movement region detector 9.

Figure 13:
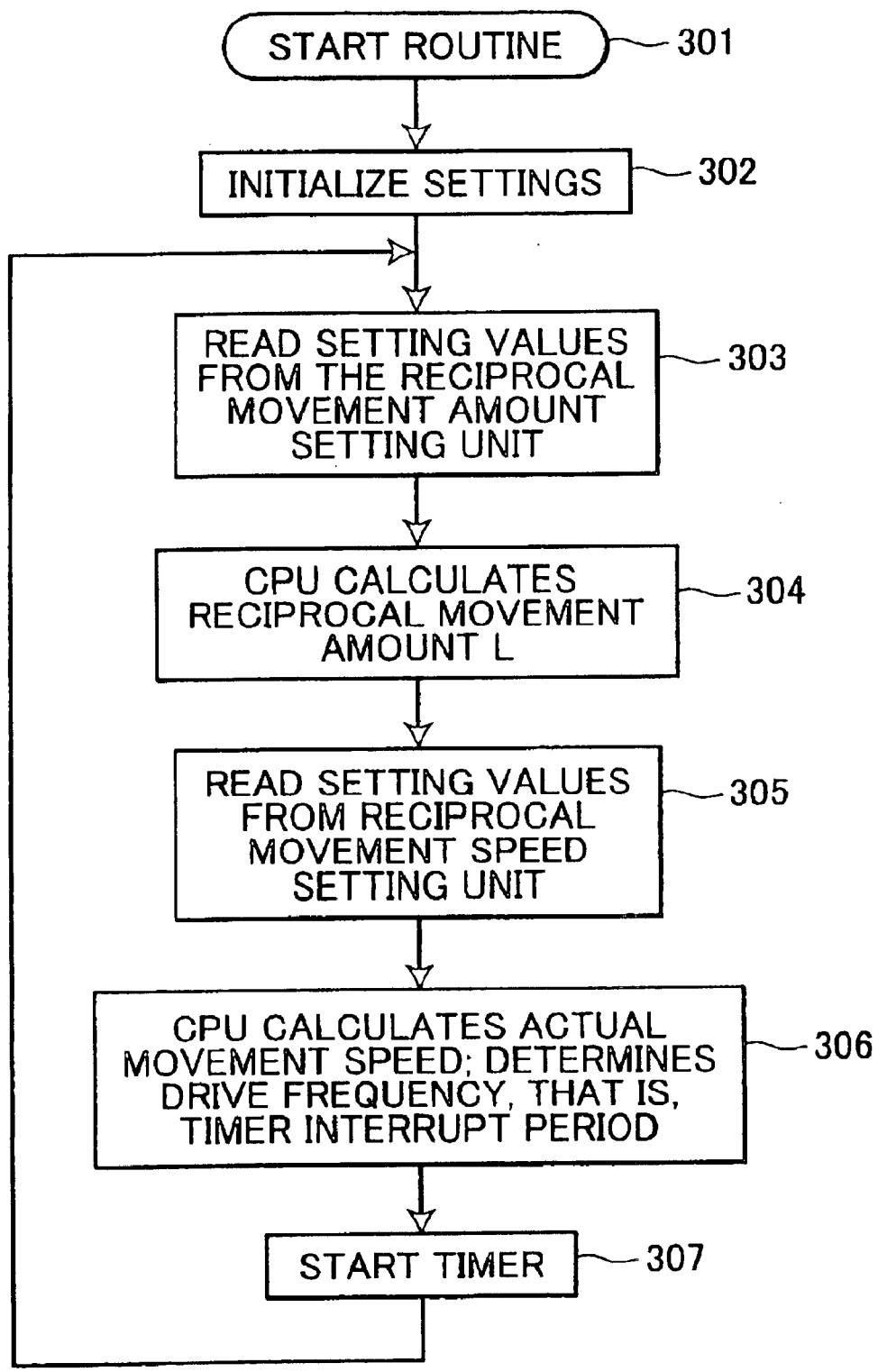
FIG. 13 is a flowchart representing main operations performed by the circuitry shown in FIG. 12.

Operations performed by the configuration of FIG. 12 will be described with reference to the flowchart in FIG. 13. When the contact points of the power switch 3b are closed by operation of the trigger lever 3a, then the control unit 4a starts operating in S301. First, in S302 the control unit 4a performs initialization operations including resetting an initial position setting completion flag. Then, the values set in the reciprocal movement amount setting unit 4e are retrieved in S303 and the CPU 4a1 calculates a corresponding reciprocal movement amount L in S304. Next, the values set in the reciprocal movement speed setting unit 4d are read in S305. In S306, the CPU 4a1 calculates the corresponding reciprocal movement speed and the drive frequency required to achieve this actual reciprocal movement speed. As described in the second embodiment, the CPU 4a1 changes the drive frequency by changing a timer interrupt period. The timer interrupt period is measured by a timer started in S307. When values are set to increase the reciprocal movement speed, the control unit 4a reduces the timer interrupt period in order to increase the drive frequency.

When the timer interrupt routine is started in S401 of the flowchart of FIG. 14, then in S402 it is judged whether or not an initial position setting completion flag has been set. If not (S402:NO), then a reverse control is performed in S403 to move the movable member in the reverse direction by a certain amount. Next, in S404 it is judged whether the movable member 1a is located at the limitation position for reverse motion based on the signal generated by the reverse motion control detector 9b when the reverse motion control detector 9b detects the notch 1d. If not (S404:NO), then the routine returns in S421. If the movable member 1a is located at the reverse limitation position (S404:YES), then the initial position setting completion flag is set in S405 and the forward flag is set in S406.

On the other hand, when it is judged in S402 that the initial position setting completion flag has been set (S402:YES), then in S410 if it judged whether the forward flag is set. If so (S410;YES), then a forward control is performed in S411. In the forward control, the control unit 4a controls the switching unit 2 from the output port 4a5. After the forward control is completed, the actual movement step number n is incremented by one in S412 and it is judged in S413 whether the reciprocal movement amount L has been reached. When the reciprocal movement amount L has not be reached (S413:NO), then the routine returns in S421. When the reciprocal movement amount L has been reached (S413:YES), then a forward flag is reset in S414, the counter that measures the actual movement step number n is reset to 0 in S415, and the routine returns in S421. When it is judged that the forward flag is reset (S410:NO), then the reverse control is performed in S416. After the reverse control is completed, the actual movement step number n is incremented by one in S417 and it is judged in S418 whether the reciprocal movement amount L has been reached. If not (S418:NO), then the routine returns in S421. When the reciprocal movement amount L is reached (S418:YES), then the forward flag is set in S419, the counter that measures the actual movement step number n is reset to 0 in S420, and the routine returns in S421.

With the configuration of the fifth embodiment, the movable member of the linear motor 1 can be reciprocally moved within a predetermined range based on the notch 1d provided on the movable member and the detector 9 provided for detecting the notch 1d.

It should be noted that the power tool T5 of the fifth embodiment can be provided with the maximum reciprocal movement speed setting unit 4c in the form of dials, sliders, or other type of value setting unit, and variable resistors, digital switches, or other means for indicating to a control unit the value set by the setting unit 4c. This would enable changing the maximum reciprocal movement speed of the power tool T5.

The power tools T1 to T5 enable setting the maximum reciprocal movement amount, the maximum reciprocal movement speed, the reciprocal movement amount, the reciprocal movement speed, and also combinations of these. Further, they enable setting the reciprocal movement amount, the reciprocal movement speed, or both in accordance with the amount that the trigger lever 3a is pulled. Therefore, the power tool according to the present invention can be set with a reciprocal movement amount and speed that is optimal for cutting the material and thickness of the work piece. Also, cutting can be performed with a reciprocal movement amount and reciprocal movement speed of the linear motor 1 in accordance with the pulling amount of the trigger lever 3a. As a result, cutting efficiency can be increased. Because the settings are performed electrically, rather than mechanically, operation and configuration of the power tool are simple. The operability of the power tool is enhanced and the power tool can be made less expensively. Also, because the settings are not made using a mechanical configuration, vibration and noise can be reduced.

While the invention has been described in detail with reference to specific embodiments thereof, it would be apparent to those skilled in the art that various changes and modifications may be made therein without departing from the spirit of the invention, the scope of which is defined by the attached claims.

For example, although the fifth embodiment describes setting the initial position in S405 after performing the reverse control, the initial position can be set after performing the forward control.

What is claimed is:

1. A power tool comprising:
    a linear motor including a movable member driven to move reciprocally, the movable member having a tool connector and a position information region, the tool connector being for connecting work bits to the movable member; and
    a movable member region detector that detects the movable member position information region of the movable member.

2. A power tool as claimed in ciaim 1, further comprising a control unit that sets, as the initial position of the movable member, position of the movable member at the time the movable member region detector detects the movable member position information region.

3. A power tool as claimed in claim 1, further comprising a control unit that sets a maximum reciprocal movement amount at which the linear motor moves the movable member based on detection of the movable member position information region by the movable member region detector.

4. A power tool as claimed in claim 1, further comprising a reciprocal movement amount setting unit for selectively setting reciprocal movement amount of the movable member.

5. A power tool as claimed in claim 1, further comprising a reciprocal movement speed setting unit for selectively setting reciprocal movement speed of the movable member.

6. A power tool as claimed in claim 5, further comprising a maximum reciprocal movement speed setting unit for selectively setting a maximum reciprocal movement speed of the movable member.

* * * * *